J. K. BLEASHACK.
POTATO DIGGING AND GATHERING MACHINE.
APPLICATION FILED DEC. 14, 1908.
940,121.
Patented Nov. 16, 1909.
3 SHEETS—SHEET 3.
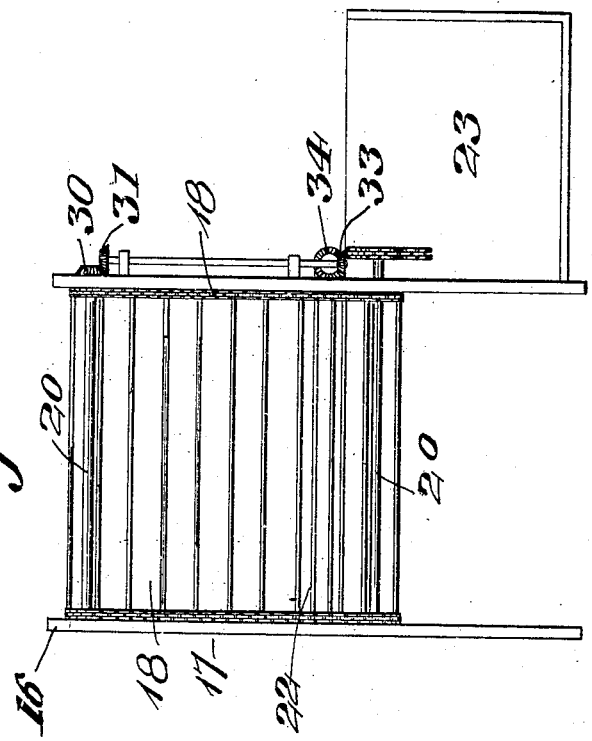
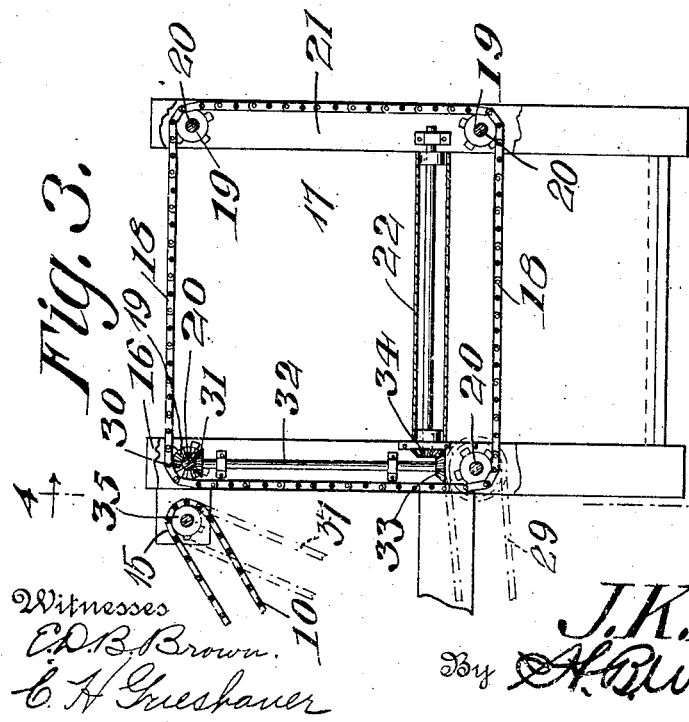
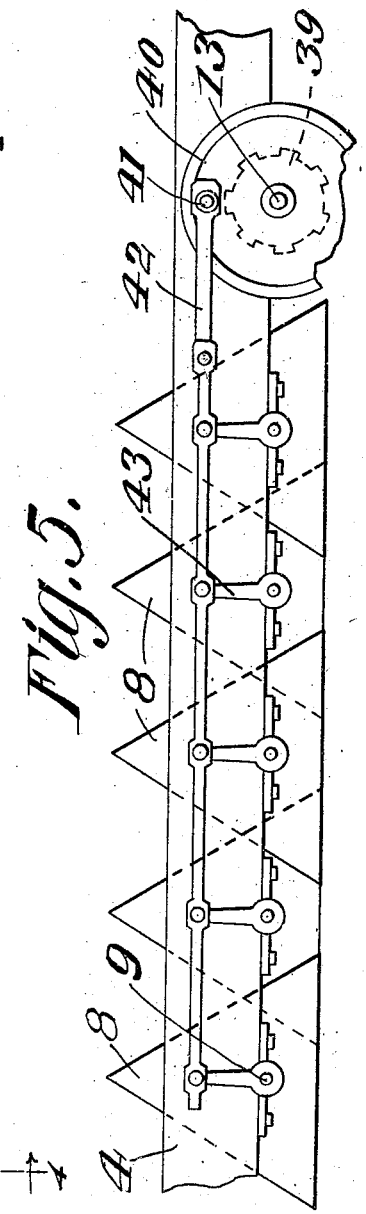
Witnesses
E. D. B. Brown.
C. H. Griesbauer.
Inventor
J. K. Bleashack,
By H. B. Wilson & Co.
Attorneys

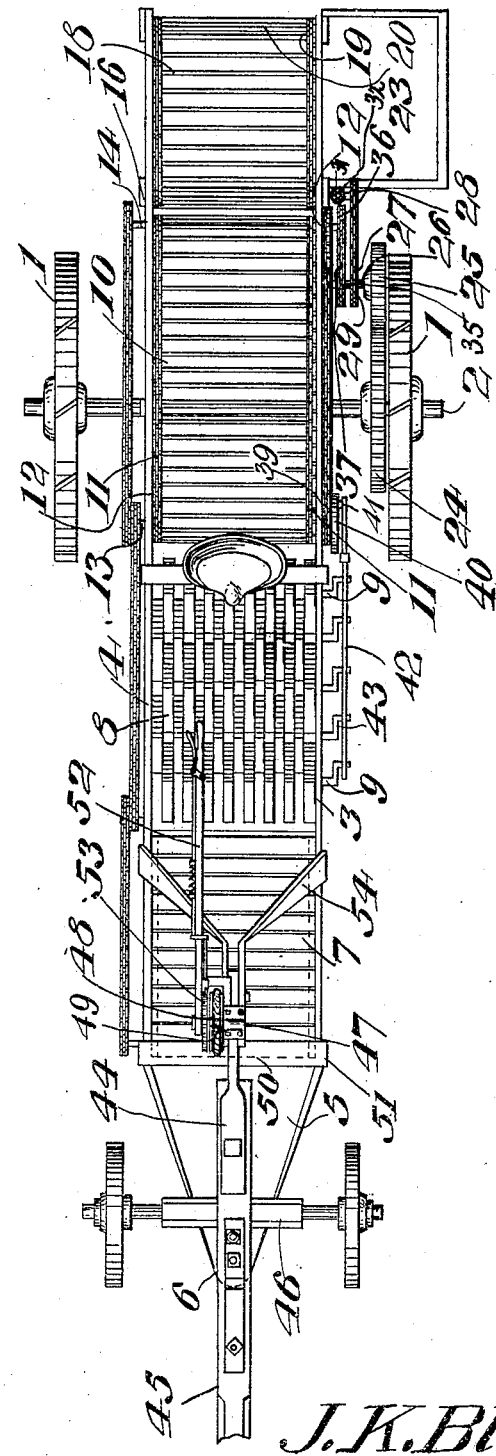

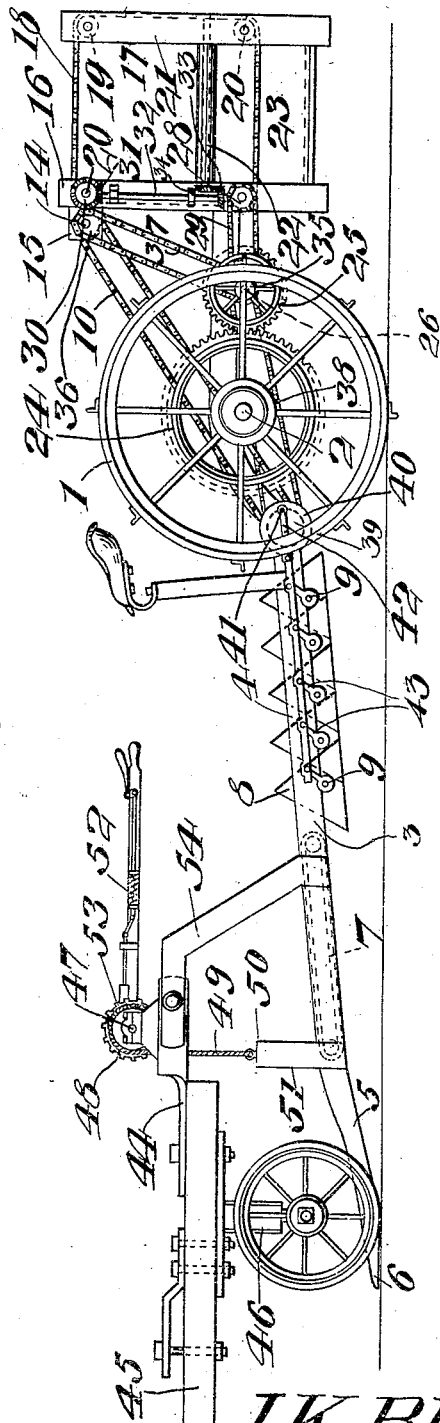

UNITED STATES PATENT OFFICE.

JOHN K. BLEASHACK, OF BLOOMER, WISCONSIN.

POTATO DIGGING AND GATHERING MACHINE.

940,121.  Specification of Letters Patent.  Patented Nov. 16, 1909.

Application filed December 14, 1908. Serial No. 467,444.

*To all whom it may concern:*

Be it known that I, JOHN K. BLEASHACK, a citizen of the United States, residing at Bloomer, in the county of Chippewa and State of Wisconsin, have invented certain new and useful Improvements in Potato Digging and Gathering Machines; and I do declare the following to be a full, clear, and exact description of the invention, such as will enable others skilled in the art to which it appertains to make and use the same.

This invention relates to improvements in potato digging and gathering machines and has for its object the production of an efficiently operating device of this kind whereby the potatoes may be dug from the ground, the dirt and vines separated therefrom and the potatoes conveyed to a box or other receptacle.

With these and other objects in view, the invention consists of certain novel features of construction, combination and arrangement of parts, as will be more fully described and particularly pointed out in the appended claims.

In the accompanying drawings, Figure 1 is a plan view of the machine embodying my improvements; Fig. 2 is a side elevation. Fig. 3 is a longitudinal section of the rear portion of the machine; Fig. 4 is a vertical transverse section taken on line 4—4 of Fig. 3, and, Fig. 5 is a fragmentary view of the beaters on an enlarged scale.

As shown, a machine constructed in accordance with this invention comprises main supporting wheels 1, a main axle 2 for the supporting wheels and a carriage 3 which is pivotally mounted near its rear end upon the supporting axle. The carriage comprises parallel side pieces 4, a downwardly inclined shovel 5 being arranged at the front of the carriage, the front of the shovel terminating in a point 6 adapted to penetrate into the ground. An endless carrier constructed from a series of cross slats or pieces 7 is arranged between the side pieces 4 of the carriage directly in rear of the shovel.

A number of transverse series of beaters 8 are arranged directly in rear of the carrier 7, each of the beaters being of approximately equilateral-triangular form and each series being fixed to a transverse shaft 9 mounted beneath the under side edges of the side pieces of the carriage. Each series of beaters is arranged to alternate with those of the adjacent series and is adapted to separate the dirt and vines from the potatoes and at the same time to carry them toward the rear of the machine and eventually deposit the same upon a rearwardly and upwardly extending carrier 10 provided at opposite edges with sprocket chains 11 which run over sprocket wheels 12 arranged near opposite ends of shafts 13 and 14 extending through the side pieces of the carriage and bearings 15 extending from the uprights 16 of an upright open frame 17 supported in rear of the main supporting wheels by the rear projecting end of the carriage. The potatoes, dirt, and vines are carried by means of the carrier 10 to a third carrier 18 which works over sprocket wheels 19 arranged near opposite ends of transverse shafts 20 which extend through the upright beams 16 and 21 of the frame 17. The cross pieces of the carrier 18 are spaced sufficiently apart to permit the potatoes to fall between the slats and upon a fourth carrier 22 which travels in a direction at right angles to the direction of travel of the carrier 18 and conveys the potatoes free of the vines and dirt separated therefrom to a potato box or receptacle 23 supported at one side of the frame 17.

It is to be understood that the greater part of the dirt and the vines is carried by means of the carrier 18 to the rear of the machine and deposited upon the ground.

I will now proceed to describe the gearing by means of which the several carriers are driven from the main axle. A gear wheel 24 is arranged near one end of the main axle and intermeshes with a second gear 25 arranged near one end of a shaft 26 extending through the side pieces of the carriage in rear of the main axle. A sprocket wheel 27 is also arranged on one end of the shaft adjacent to the gear 25 and extending over said sprocket wheel, and a sprocket wheel 28 fixed to one end of the front lower shaft 20 is a sprocket chain 29. By the above described arrangement it is evident that the carrier 18 is driven in the proper direction. A bevel gear 30 is arranged at the outer end of the upper front axle 20 and intermeshes with a bevel gear 31 fixed to the upper end of an upright shaft 32 suitably journaled to the outer face of one of the front uprights 16 of the frame 17, the lower end of the shaft 32 carrying a bevel gear 33 which intermeshes with a bevel gear 34 by means of which the carrier 22 is driven. A sprocket wheel 35 is also arranged at one end of the shaft 26 adjacent to the sprocket wheel 27 and running over said sprocket and a sprocket wheel 36 fixed to one end of shaft 14 is a drive sprocket chain 37, by means of which the carrier 10 is driven in the proper direction. A sprocket chain 38 is also driven from the shaft 26 and travels over a sprocket wheel 39 arranged at one end of the shaft 13. A drive wheel 40 of somewhat larger dimensions than the sprocket 39 is also arranged on the shaft 13 adjacent thereto and eccentrically connected, as at 41, to said drive wheel is a longitudinally extending pitman 42 to which are connected the outer ends of crank arms 43 fixed to adjacent ends of the shafts 9 carrying the beaters 8. The front end of the carriage is supported and adjusted vertically by the following arrangement:

A rearwardly extending horizontal support 44 is bolted to the frame 45 of a truck frame 46 to which the draft animals are to be attached. An operating shaft 47 is mounted in suitable bearings arranged upon the rear end of the support 44. A drum 48 is fixed to said operating shaft over which is adapted to be wound a flexible connecting element, such as a rope 49, the lower end of which is connected with a cross piece 50 provided with legs 51 which are bolted to the side pieces of the carriage. An operating lever 52 is fixed to the operating shaft 48 and is provided with the usual locking bolt which is adapted to engage either of the notches of the segmental rack 53 mounted upon the rear end of the support 44. By this construction it will be seen that the front end of the carriage may be raised or lowered in order to regulate the depth at which it is desired that the shovel enter the ground by means of the operating lever 52. Braces 54 are pivotally connected at their lower ends to the side pieces of the carriage and at their upper or opposite ends to the rear end of the support 44, said braces serving as a means to hold the front end of the carriage against lateral movement with reference to the truck frame.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new is:—

1. A potato digging and gathering machine comprising a main axle, a carriage pivotally mounted thereon, a shovel at the front end of the carriage, a carrier arranged in rear of the shovel, to receive the potatoes, beaters pivotally mounted in rear of the carrier to separate the dirt and vines from the potatoes, a second upwardly inclined carrier to receive the separated potatoes, vines and dirt, a carrier frame supported upon the carriage in rear of the supporting wheels, a third carrier arranged in said carrier frame to receive the potatoes, dirt and vines from the upwardly inclined carrier, a fourth carrier arranged in the carrier frame to travel in a direction at right angles to the direction of travel of the third carrier, a receptacle arranged at one side of the carrier frame to receive the potatoes, and means for driving the carriers and beaters from the main axle, the slats of the third mentioned carrier being spaced apart sufficiently to permit the potatoes, free of the vines and dirt, to drop upon the fourth mentioned carrier.

2. In a machine of the class described, a carriage provided with rearwardly and longitudinally extending extensions, an upright carrier frame mounted upon the extensions of the carriage, a slatted carrier having horizontal upper and lower portions mounted in the carrier frame, means supported by the main supporting frame for digging the potatoes and for separating them from the dirt and vines, an upwardly inclined carrier mounted in the main frame to receive and deliver the separated potatoes, dirt and vines upon the upper portion of the slatted carrier, a third carrier mounted in the carrier frame between the upper and lower horizontal portions thereof and arranged to travel in a direction at right angles to the direction of travel thereof, a potato receptacle arranged at one side of the carrier frame to receive the potatoes from the third carrier, and means for driving the carriers, the slats of the slatted carrier being spaced sufficiently apart to permit the potatoes, free of the dirt and vines, to fall upon the third carrier.

In testimony whereof I have hereunto set my hand in presence of two subscribing witnesses.

JOHN K. BLEASHACK.

Witnesses:
L. B. KIRKPATRICK,
A. F. BRYCE.